(12) United States Patent
Glickman et al.

(10) Patent No.: US 10,730,441 B2
(45) Date of Patent: Aug. 4, 2020

(54) VEHICLE WITH ARTICULATING GRILLE

(71) Applicant: FORD GLOBAL TECHNOLOGIES, LLC, Dearborn, MI (US)

(72) Inventors: David Brian Glickman, Southfield, MI (US); Stuart C. Salter, White Lake, MI (US); Mark A. Wisneski, Dearborn, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 14 days.

(21) Appl. No.: 16/178,992

(22) Filed: Nov. 2, 2018

(65) Prior Publication Data

US 2020/0139894 A1    May 7, 2020

(51) Int. Cl.
| | |
|---|---|
| *B60R 5/02* | (2006.01) |
| *B60R 7/02* | (2006.01) |
| *B60J 5/02* | (2006.01) |
| *B60R 11/02* | (2006.01) |
| *B62D 25/08* | (2006.01) |
| *E05D 15/58* | (2006.01) |
| *B60H 1/00* | (2006.01) |
| *B60R 11/00* | (2006.01) |
| *E05D 3/14* | (2006.01) |

(52) U.S. Cl.
CPC ........... *B60R 5/02* (2013.01); *B60H 1/00271* (2013.01); *B60J 5/02* (2013.01); *B60R 7/02* (2013.01); *B60R 11/0229* (2013.01); *B62D 25/087* (2013.01); *E05D 15/582* (2013.01); *B60H 2001/003* (2013.01); *B60R 2011/0036* (2013.01); *B60Y 2200/91* (2013.01); *E05D 3/147* (2013.01); *E05Y 2900/536* (2013.01); *E05Y 2900/548* (2013.01)

(58) Field of Classification Search
CPC ............ B60R 5/02; B60R 7/02; B62D 25/087
USPC ................................ 296/193.1, 193.09, 37.1
See application file for complete search history.

(56) References Cited

U.S. PATENT DOCUMENTS

| | | | |
|---|---|---|---|
| 2,468,809 A | 5/1949 | Brock et al. | |
| 4,415,052 A * | 11/1983 | Gauer | B62D 25/12 180/69.2 |
| 4,848,498 A * | 7/1989 | Hart | B60J 5/00 180/69.2 |
| 7,261,173 B2 | 8/2007 | Kurtz et al. | |
| 8,573,345 B2 * | 11/2013 | Werner | B62D 25/10 180/69.24 |

(Continued)

FOREIGN PATENT DOCUMENTS

| | | |
|---|---|---|
| DE | 7704129 U1 | 4/1981 |
| EP | 0908373 A1 | 4/1999 |

(Continued)

*Primary Examiner* — Joseph D. Pape
(74) *Attorney, Agent, or Firm* — David Coppiellie; MacMillan, Sobanski & Todd, LLC

(57) ABSTRACT

A vehicle includes a body structure defining a front trunk having a front opening. A grille coves the front opening in a closed position and is pivotable about a vertical hinge, or a horizontal hinge along a top edge, secured to the body structure to provide access to the front opening. The grille may include a bin mounted on an inner surface of the grille and pivotable with the grille, a heating/cooling duct or a video display.

15 Claims, 4 Drawing Sheets

(56) References Cited

U.S. PATENT DOCUMENTS

| | | | |
|---|---|---|---|
| 2009/0072583 A1* | 3/2009 | Elliott | B60J 5/0479 296/155 |
| 2009/0101422 A1 | 4/2009 | Subramanian et al. | |
| 2012/0049579 A1* | 3/2012 | Konchan | B60J 5/0479 296/202 |

FOREIGN PATENT DOCUMENTS

| | | |
|---|---|---|
| FR | 981627 A | 5/1951 |
| WO | 03070519 A1 | 8/2003 |

* cited by examiner

VEHICLE WITH ARTICULATING GRILLE

BACKGROUND OF THE INVENTION

The present invention relates to a vehicle having a front trunk and more particularly to user access to the trunk.

Some vehicles include a front trunk, which may be due to the engine being located other than under a hood at the front of the vehicle, or due to the vehicle operating as a battery electric, in which case there is no engine under the hood.

In particular vehicle models, there may be customer options for an engine-based powertrain (gasoline, diesel, etc.), a hybrid electric powertrain or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. Ease of access to this front trunk area is desirable.

SUMMARY OF THE INVENTION

An embodiment contemplates a vehicle including body structure defining a front trunk having a front opening, a grille covering the front opening in a closed position and pivotable about a vertical hinge secured to the body structure to provide access to the front opening, and a bin mounted on an inner surface of the grille and pivotable with the grille.

An embodiment contemplates a vehicle including body structure defining a front trunk having a front opening, and a grille covering the front opening in a closed position and pivotable about a horizontal hinge, secured between a top edge of the grille and the body structure to provide access to the front opening.

An advantage of an embodiment is that essentially the same vehicle structure and front end look may be employed for various drivetrain configurations of a vehicle, while providing ease of access to a front trunk for a battery electric powertrain configuration of the vehicle. The ease of access to the front trunk is provided while also providing features that add to the functionality of the front trunk, such as lighting, storage bins, a video display and conditioning the air in the front trunk.

DETAILED DESCRIPTION

Figure 1:
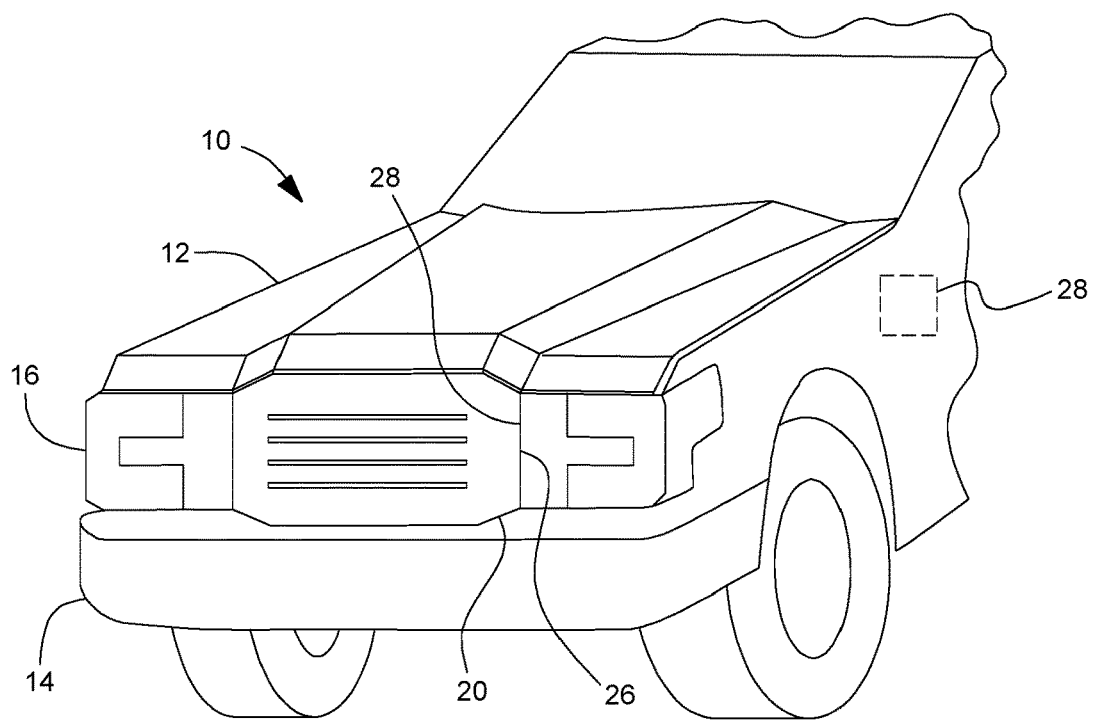
FIG. 1 is a schematic perspective view of a front end of a vehicle showing a grille in a closed position.
Figure 2:
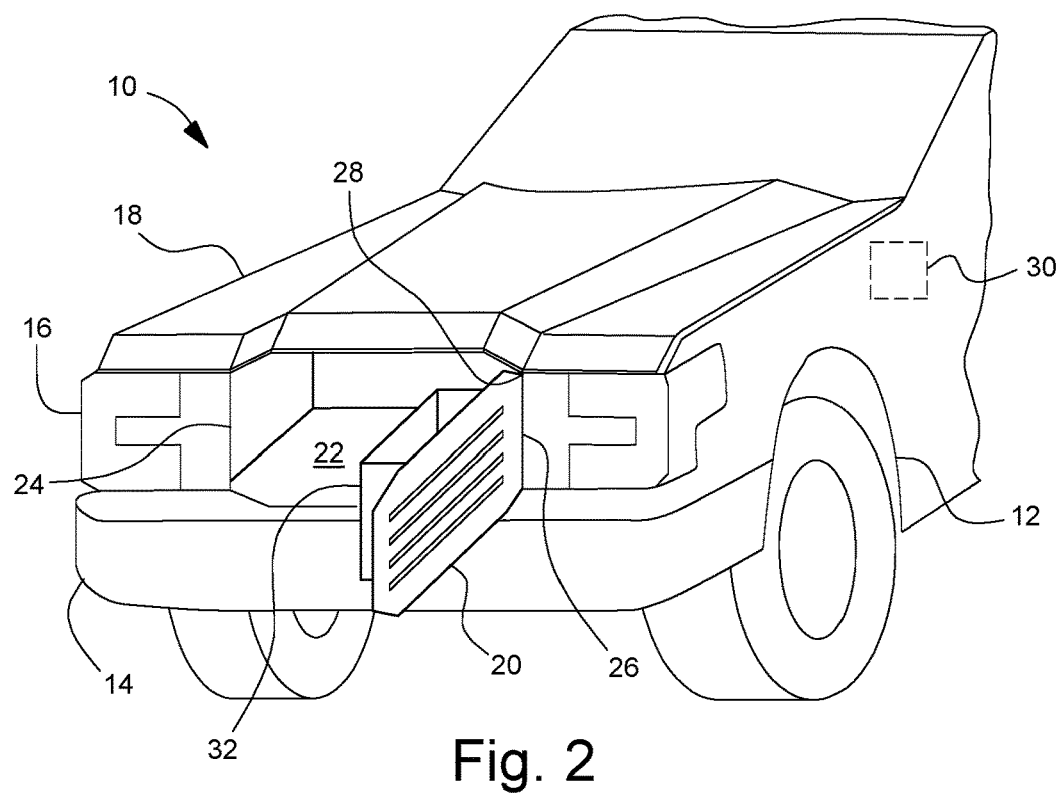
FIG. 2 is a schematic perspective view similar to FIG. 1 but with the grille in an open position.
Figure 3:
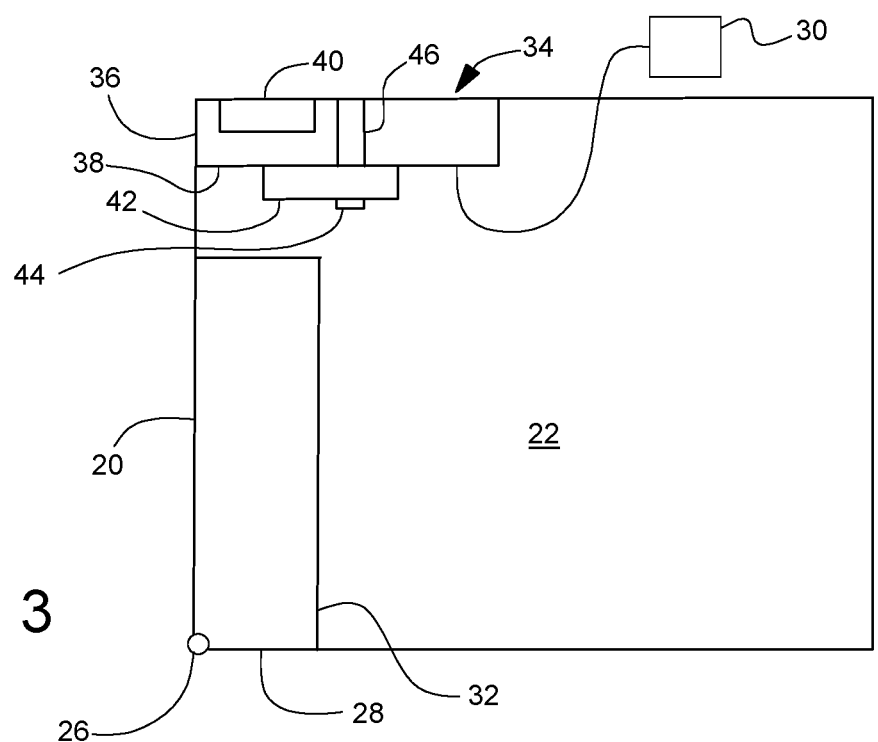
FIG. 3 is a schematic plan view within a front trunk.

FIGS. 1-3 illustrate a vehicle 10 having front fenders 12, a front bumper 14, headlights 16, a hood 18 and a grille 20. The vehicle 10 may be a pickup truck, although it may be a different type of vehicle if so desired.

The grille 20 may be sized and shaped to match a grille in an engine driven model of this vehicle in order to maintain the same look and allow for essentially the same front end vehicle body structure for both models. While the grille 20 may be configured to look the same as other models from outside of the vehicle 10, it may have a solid inner surface in order to keep water out of a front trunk 22 and provide other functionality. The solid inner surface may be feasible in this battery electric vehicle 10, rather than having perforations or openings, since no air flow is needed for engine cooling.

The grille 20 moves out of the way of a front opening 24 of the front trunk 22, which allows for access. A vertical hinge 26 mounts the grille 20 to vehicle structure 28. When referring to a "vertical" hinge herein, this means a hinge that causes the grille 20 to pivot about a generally vertical axis. The vertical hinge 26 may be, for example, a piano type of hinge, a four bar linkage type of hinge or a gooseneck type of hinge, as desired for the particular model vehicle and grille combination.

A controller 30 may control an actuator that provides automated opening/closing of the grille 20, if so desired, and/or the grille 20 may be manually opened/closed.

The grille 20 may include a bin 32, mounted to the inner surface of the grille 20, that pivots with the grille 20. This may provide convenient access to certain items that one wishes to have readily available for removal from the front trunk 22. The grille mounted bin 32 may be insulated or provide refrigeration like a cooler, if so desired. The bin 32 may also include lighting mounted to it to illuminate the contents of the bin 32.

Additionally, the grille 20 may include a climate control assembly 34 (see FIG. 3) that includes a removable/slidable cover 36 covering an opening in the grille 20 in order to allow air into a duct 38 that extends into the front trunk 22. A fan 46 may be employed to propel air through the duct 38. Within the duct 38 a heating-cooling device 40 may be mounted to provide heating and cooling to the air passing through the duct 38. This device 40 may be, for example, a Peltier device or other similar type of device known to those skilled in the art. A control module 42 may be mounted to the duct 38, which may be employed in conjunction with the controller 30 or, alternatively, the controller 30 may perform the functions instead of a separate control module 42. A temperature sensor 44 may mount within the front trunk 22 to provide temperature input to the control module 42, which then activates the heating-cooling device 40 to achieve a desired front trunk temperature. The desired temperature may be set by a vehicle user through an input device, for example a touch screen within the vehicle's passenger compartment. The temperature sensor may be, for example, a thermistor or other similar type of sensor known to those skilled in the art.

Figure 4:
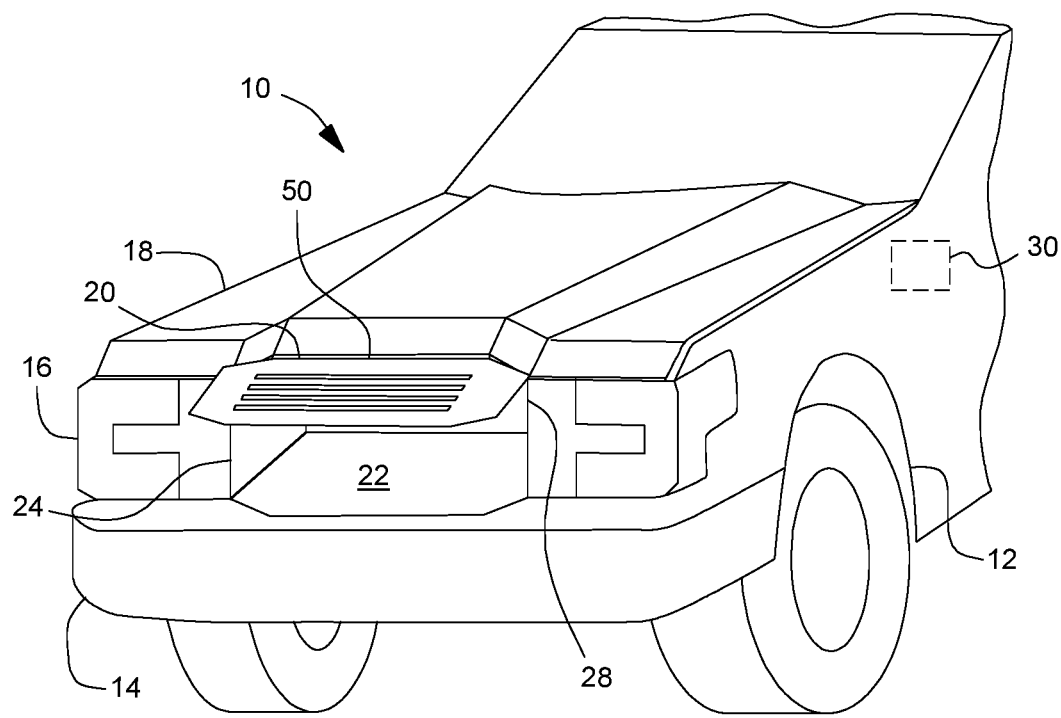
FIG. 4 is a schematic perspective view similar to FIG. 2, but illustrating an alternative mounting of the grille, which is in a partially open position.
Figure 5:
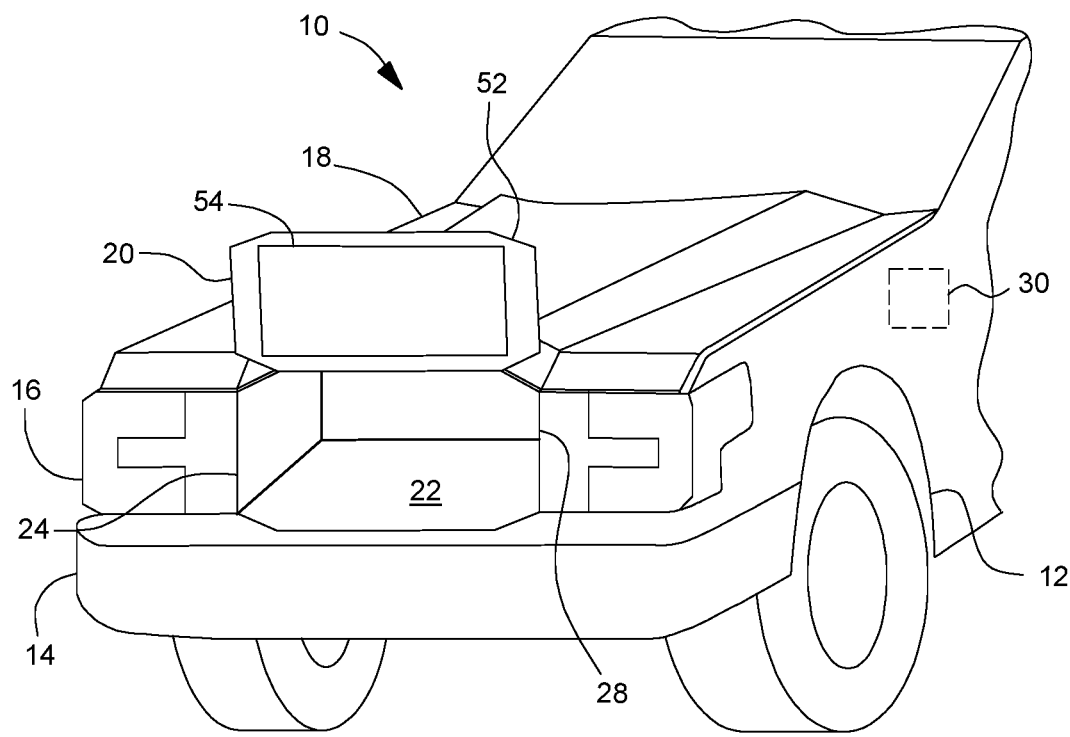
FIG. 5 is a schematic perspective view similar to FIG. 4, but illustrating the grille in a full open position.
Figure 6:
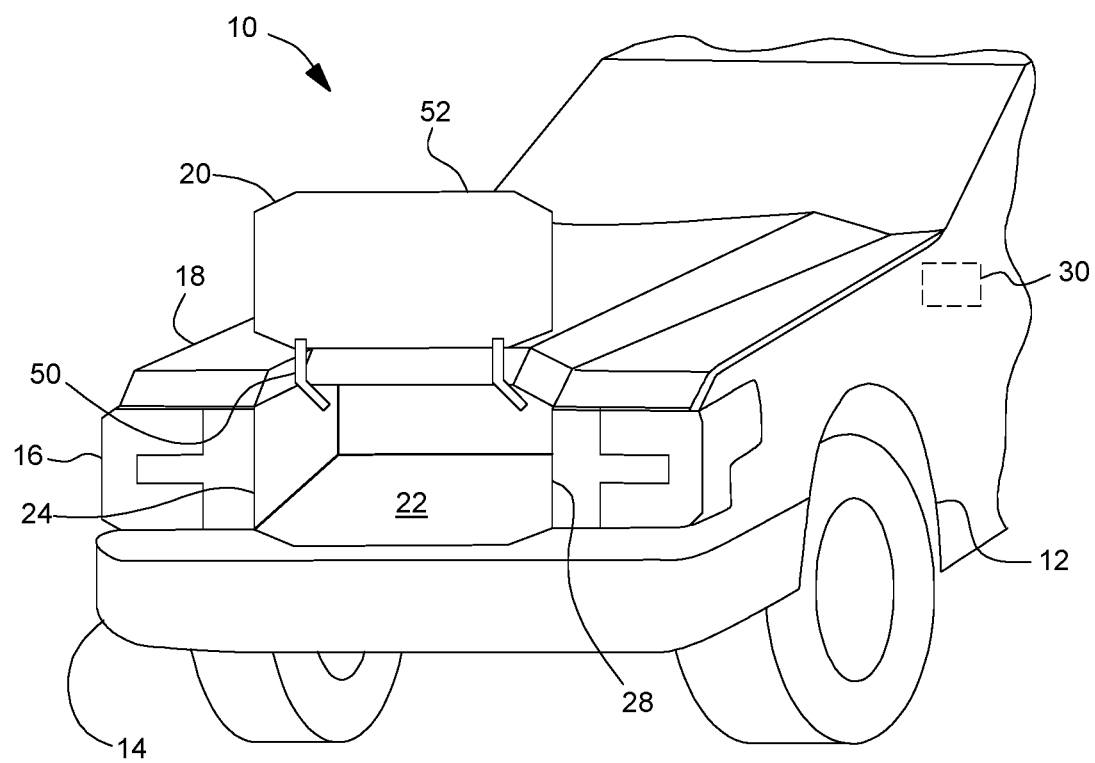
FIG. 6 is a schematic perspective view similar to FIG. 5, but illustrating the grille mounted with a modified pivot structure.

FIGS. 4-6 are similar to the configuration of FIGS. 1-3, and so the same element numbers will be used for similar elements and a repeated detailed discussion of these herein will be omitted. In FIGS. 4-6, the grille 20 is mounted to the vehicle structure 28 via a horizontal hinge 50 along a top edge of the grille. When referring to a "horizontal" hinge herein, this means a hinge that causes the grille 20 to pivot about a generally horizontal axis. The Horizontal hinge 50 may be, for example, a piano type of hinge (FIGS. 4-5), a four bar linkage type of hinge or a gooseneck type of hinge (FIG. 6), as desired for the particular model vehicle and grille combination.

The inner surface 52 of the grille 20 may support a video display 54 (FIG. 5), which may be in communication with the controller 30 to allow for activation only when the grille 20 is open, or the inner surface 52 of the grille 20 may be a smooth inner surface without any display (FIG. 6).

Additionally, the grille position may be sensed and communicated to the controller 30, with the controller 30 limiting the vehicle shifting out of Park when the grille 20 is open. This assures that a vehicle driver has good forward vision without the grille 20 blocking any of the view since the grille 20 pivots upward to its open position.

Figure 7:
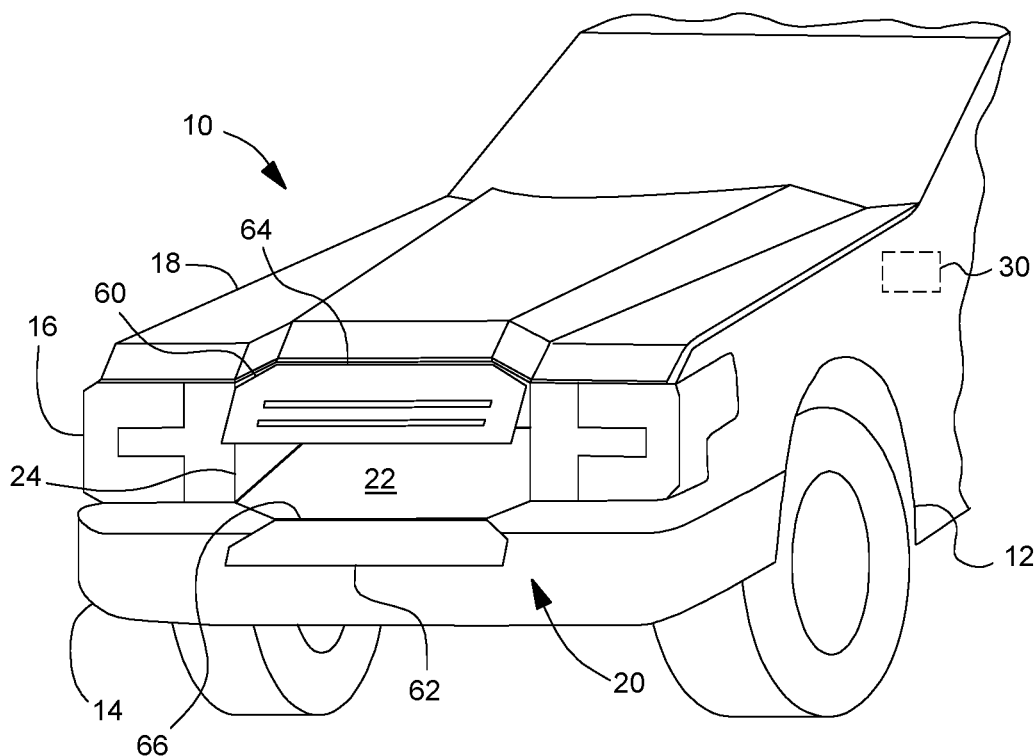
FIG. 7 is a schematic perspective view similar to FIG. 2, but illustrating an alternative mounting of the grille, which is in a partially open position.
Figure 8:
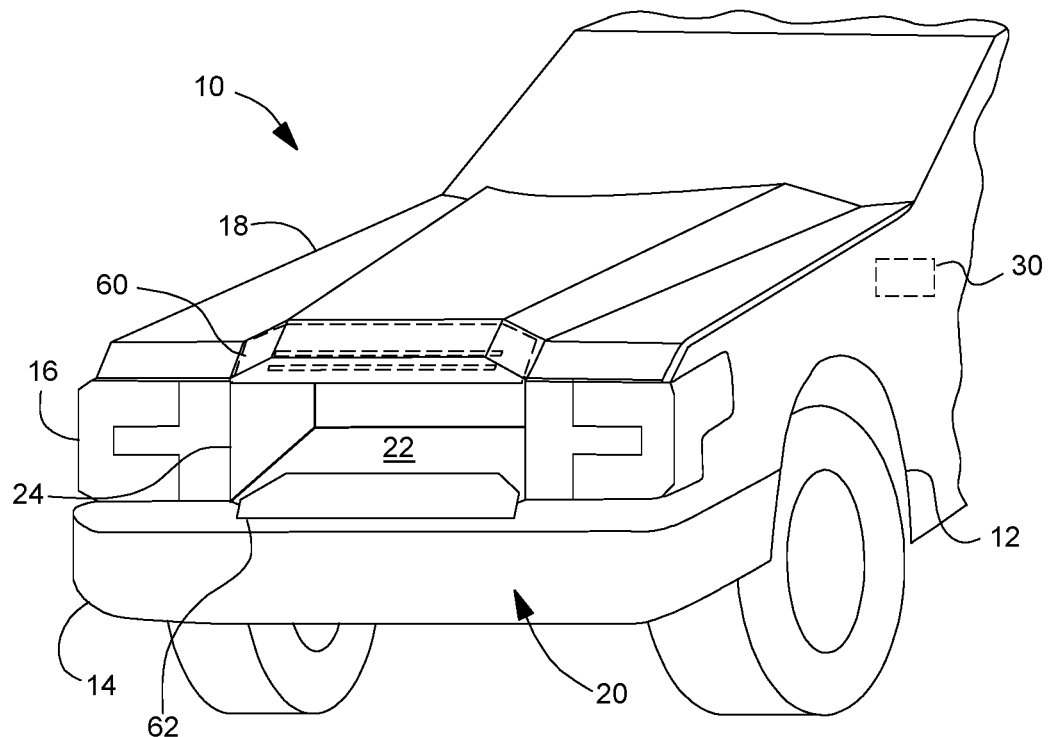
FIG. 8 is a schematic perspective view similar to FIG. 7, but illustrating the grille in a full open position.

FIGS. 7-8 are similar to the configuration of FIGS. 1-3, and so the same element numbers will be used for similar elements and a repeated detailed discussion of these herein will be omitted.

In FIGS. 7-8 the grille 20 is a two piece grille 20 having an upper portion 60 and a lower portion 62. The upper portion pivots about a horizontal hinge 64 and the lower portion pivots about a horizontal hinge 66. Again the hinges may be, for example, a piano type of hinge, a four bar linkage type of hinge or a gooseneck type of hinge, as desired for the particular model vehicle and grille combination. Upon pivoting to partially open positions (FIG. 7), the grille portions 60, 62 and hinges 64, 66 may be retracted partially or fully into the front trunk 22 to provide ease of access to the front trunk 22. Retraction may be accomplished with cabled or geared mechanisms that slide the grille portions 60, 62 fore-aft relative to the vehicle 10.

While certain embodiments of the present invention have been described in detail, those familiar with the art to which this invention relates will recognize various alternative designs and embodiments for practicing the invention as defined by the following claims.

The invention claimed is:

1. A vehicle comprising:
   body structure defining a front trunk having a front opening;
   a grille covering the front opening in a closed position and pivotable about a vertical hinge secured to the body structure to provide access to the front opening;
   a bin mounted on an inner surface of the grille and pivotable with the grille; and
   a duct mounted in the front trunk behind a grille opening in the grille, a fan directing air through the duct, and a heating-cooling assembly for heating and cooling air flowing through the duct into the front trunk.

2. The vehicle of claim 1 further including a temperature sensor in the front trunk and a controller configured to control the heating-cooling assembly to provide a desired temperature within the front trunk.

3. The vehicle of claim 1 further including a movable cover to selectively block airflow through the grille opening.

4. The vehicle of claim 1 wherein the vertical hinge is a gooseneck hinge.

5. The vehicle of claim 1 wherein the vertical hinge is a four-bar linkage.

6. A vehicle comprising:
   body structure defining a front trunk having a front opening; and
   a grille covering the front opening in a closed position and pivotable upward about a horizontal hinge, secured between a top edge of the grille and the body structure to provide access to the front opening; wherein the grille includes a video display mounted on an inner surface that is visible in front of the vehicle when the grille is in an open position.

7. The vehicle of claim 6 further including a controller configured to prevent the vehicle from moving when the grille is in the open position.

8. The vehicle of claim 6 wherein the horizontal hinge is a gooseneck hinge.

9. The vehicle of claim 6 wherein the horizontal hinge is a four-bar linkage.

10. The vehicle of claim 6 wherein the grille includes an upper portion that pivots about the horizontal hinge and a lower portion that is pivotable downward about a lower horizontal hinge, secured between a bottom edge of the lower portion and the body structure.

11. The vehicle of claim 10 wherein the upper portion is slidably retractable into the front trunk under a hood.

12. The vehicle of claim 10 wherein the lower portion is slidably retractable into the front trunk.

13. A vehicle comprising:
    body structure defining a front trunk having a front opening; and
    a grille covering the front opening in a closed position and pivotable upward about a horizontal hinge, secured between a top edge of the grille and the body structure to provide access to the front opening; wherein the grille includes an upper portion that pivots about the horizontal hinge and a lower portion that is pivotable downward about a lower horizontal hinge, secured between a bottom edge of the lower portion and the body structure.

14. The vehicle of claim 13 wherein the upper portion is slidably retractable into the front trunk under a hood.

15. The vehicle of claim 13 wherein the lower portion is slidably retractable into the front trunk.

* * * * *